(12) United States Patent
Banerjee et al.

(10) Patent No.: US 8,821,343 B2
(45) Date of Patent: Sep. 2, 2014

(54) METHOD FOR OPERATING A DRIVE TRAIN

(75) Inventors: Alexander Banerjee, Oberteuringen (DE); Bernard Hunold, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 141 days.

(21) Appl. No.: 13/703,373

(22) PCT Filed: May 5, 2011

(86) PCT No.: PCT/EP2011/057167
§ 371 (c)(1),
(2), (4) Date: Dec. 11, 2012

(87) PCT Pub. No.: WO2011/157481
PCT Pub. Date: Dec. 22, 2011

(65) Prior Publication Data
US 2013/0090209 A1    Apr. 11, 2013

(30) Foreign Application Priority Data
Jun. 17, 2010  (DE) .......................... 10 2010 030 247

(51) Int. Cl.
*B60W 10/06* (2006.01)
*B60W 20/00* (2006.01)

(52) U.S. Cl.
USPC ................................ 477/42; 477/3; 180/53.8

(58) Field of Classification Search
USPC ................................ 477/3, 42; 180/53.5, 53.8
See application file for complete search history.

(56) References Cited

U.S. PATENT DOCUMENTS

| 5,755,303 | A | 5/1998 | Yamamoto et al. |
| 5,924,406 | A | 7/1999 | Kinugasa et al. |
| 6,464,028 | B1 | 10/2002 | Imani |
| 6,561,940 | B2 * | 5/2003 | Goi et al. ................ 475/208 |
| 6,715,291 | B1 * | 4/2004 | Liao ......................... 60/698 |
| 2001/0024104 | A1 | 9/2001 | Suzuki |

FOREIGN PATENT DOCUMENTS

| DE | 100 35 431 A1 | 4/2001 |
| DE | 697 10 254 T2 | 8/2002 |
| DE | 102 25 455 C1 | 11/2003 |
| DE | 10 2006 022 249 A1 | 11/2007 |

(Continued)

OTHER PUBLICATIONS

German Search Report Corresponding to DE 10 2010 030 247.3.

(Continued)

*Primary Examiner* — Roger Pang
(74) *Attorney, Agent, or Firm* — Davis & Bujold, PLLC; Michael J. Bujold

(57) ABSTRACT

A method of operating a drive-train comprising an auxiliary output on the engine side that can be coupled to the combustion engine via a continuously variable transmission and a generator such that when the engine is running, the generator can be driven at a constant rotational speed regardless of the speed of the engine, such that a condition parameter of the auxiliary output is regulated between a pair of limit values. The condition parameter is regulated as a function of its current actual value, the limit values of the condition parameter and also as a function of a current and/or anticipated driving situation such that parameters are determined, in the regulator, for the energy input into the auxiliary output as a function of these input data, and hence for a corresponding energy uptake from the engine.

11 Claims, 2 Drawing Sheets

(56) References Cited

FOREIGN PATENT DOCUMENTS

| DE | 10 2007 039 107 A1 | 2/2009 |
| EP | 0 811 757 A2 | 12/1997 |
| EP | 0 888 920 A2 | 1/1999 |
| FR | 2 763 901 A1 | 12/1998 |
| WO | 2004/097264 A1 | 11/2004 |

OTHER PUBLICATIONS

International Search Report Corresponding to PCT/EP2011/057167.
Written Opinion Corresponding to PCT/EP2011/057167.

* cited by examiner

METHOD FOR OPERATING A DRIVE TRAIN

This application is a National Stage completion of PCT/EP2011/057167 filed May 5, 2011, which claims priority from German patent application serial no. 10 2010 030 247.3 filed Jun. 17, 2010.

FIELD OF THE INVENTION

The invention concerns a method for operating a drive train of a motor vehicle.

BACKGROUND OF THE INVENTION

FIG. 1 shows the basic structure of a drive train of a motor vehicle known from the prior art, which has an auxiliary output on the engine side. Thus, the drive train in FIG. 1 comprises a drive aggregate consisting of an internal combustion engine 1, with a transmission 3 connected between the internal combustion engine 1 and a drive output 2. The transmission 3 converts rotational speeds and torques and thereby transmits traction force provided by the internal combustion engine 1 to the drive output 2. In the drive train of FIG. 1, a clutch 4 is connected between the internal combustion engine 1 and the transmission 3, by means of which the internal combustion engine 1 can be decoupled from or coupled to the drive output 2, and which in particular serves as a transmission-external starting element. As an alternative, a transmission-internal starting element can also be provided.

In addition the drive train of FIG. 1 has an auxiliary output 5 on the engine side, which in the example shown is formed by a cooling aggregate 6 and a refrigerating trailer 7 which is cooled by the cooling aggregate 6. The auxiliary output 5 on the engine side, also called an engine-side PTO (Power Take Off), is coupled to the internal combustion engine 1 by a continuously variable transmission 8 and a generator 9 in such manner that when the internal combustion engine 1 is running, the continuously variable transmission 8 provides substantially constant rotational speed at the drive input of the generator 9 regardless of the actual speed of the internal combustion engine 1, so that regardless of the actual speed of the internal combustion engine 1 the generator can deliver a defined electric input for operating the auxiliary output 5. In this case the continuously variable transmission 8 is a hydraulic continuously variable transmission. However, the continuously variable transmission 8 can also be in the form of a mechanical continuously variable transmission or an electric continuously variable transmission, for example comprising two electric machines and two rectifiers.

In particular, regardless of the actual running speed of the internal combustion engine 1 the generator 9 delivers a defined electric alternating voltage characterized by a defined voltage potential and a defined voltage frequency for operating the auxiliary output 5.

According to the prior art, to operate such a drive train with an engine-side auxiliary output 5, the procedure is to regulate a condition parameter of the engine-side auxiliary output 5, the latter having a storage function in relation to the condition parameter, by means of a regulator associated with the engine-side auxiliary output 5. In FIG. 2, as the condition parameter for the engine-side auxiliary output 5 comprising the cooling aggregate 6 and the refrigerating trailer 7, a temperature T inside the refrigerating trailer 7 is shown, which can be regulated by a regulator of the cooling aggregate 6 between two limit values $T_{MIN}$ and $T_{MAX}$ in such manner that the temperature in the refrigerating trailer 7, which varies with time t, ranges between these limit values.

For this purpose, according to the prior art a two-point regulator is used as the regulator of the cooling aggregate 6. Such a two-point regulator exclusively compares whether the current actual value of the condition parameter, i.e. in FIG. 2 the actual temperature, is between the limit values and, depending on the result of the comparison, the auxiliary output 5, namely in the example embodiment of FIG. 1 the cooling aggregate 6, either draws energy or power from the internal combustion engine 1, or not.

From the standpoint of energy such operation of the drive train is not favorable. In particular, it can lead to higher fuel consumption by the internal combustion engine. A method is therefore needed for operating a drive train having an auxiliary output on the engine side, by virtue of which fuel consumption can be reduced.

SUMMARY OF THE INVENTION

Starting from there the present invention addresses the problem of providing a new type of method for operating a drive train.

According to the invention, the condition parameter of the engine-side auxiliary output is regulated as a function of the current actual value of the condition parameter, as a function of the limit values of the condition parameter, and as a function of a current driving situation and/or as a function of an anticipated driving situation of the motor vehicle, in such manner that depending on these input data, parameters are determined in the regulator for an energy input into the engine-side auxiliary output and therefore for a corresponding uptake of energy from the internal combustion engine.

The method according to the invention allows a mode of operation of a drive train with an auxiliary output on the engine side which is advantageous from the standpoint of energy. In particular, the fuel requirement or fuel consumption can be reduced.

BRIEF DESCRIPTION OF THE DRAWINGS

Preferred further developments of the invention emerge from the description given below. An example embodiment of the invention, to which it is not restricted, is explained in more detail with reference to the drawings, which show.

DETAILED DESCRIPTION OF THE PREFERRED EMBODIMENTS

Figure 1:
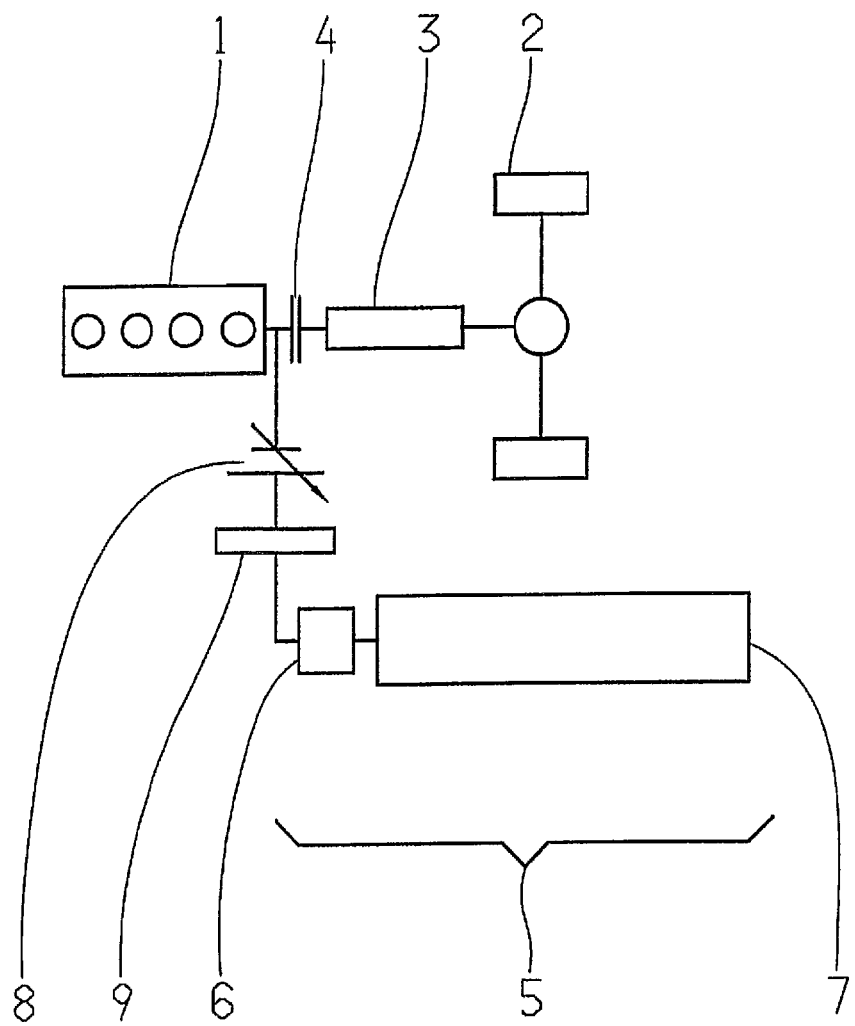
FIG. 1: A block diagram of a drive train.
Figure 2:
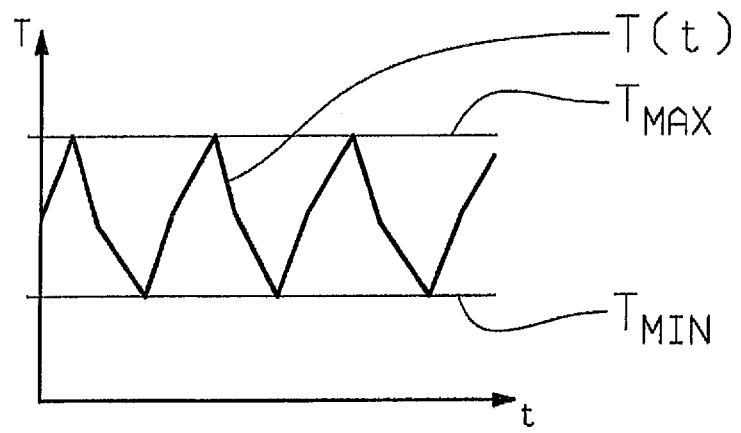
FIG. 2: A diagram to illustrate the method known from the prior art for operating a drive train.

The present invention concerns a method for operating a drive train of a motor vehicle having an auxiliary output on the engine side, in particular the drive train shown in FIG. 1.

Although the invention is described below with reference to this preferred embodiment of a drive train, already at this point it should be mentioned that the method according to the invention can also be used with other drive train configurations having an auxiliary output on the engine side.

The use of the invention is not limited to drive trains whose auxiliary output is in the form of a cooling aggregate and a refrigerating trailer; rather, drive trains with other auxiliary outputs that comprise a storage function in regard to their condition parameter to be regulated can also be operated using the method according to the invention, for example drive trains whose auxiliary outputs are hydraulic auxiliary outputs.

In the context of the present invention, the procedure for regulating a condition parameter of an engine-side auxiliary output that is to be regulated, is that the condition parameter of the engine-side auxiliary output is regulated as a function of the current actual value of the condition parameter to be regulated, as a function of the limit values of the condition parameter and as a function of the current driving situation and/or as a function of an anticipated driving situation of the motor vehicle, namely in such manner that as a function of these input data, i.e. as a function of the current actual value of the condition parameter, as a function of its limit values and as a function of the current and/or the anticipated driving situation of the motor vehicle, parameters are determined in the regulator for energy input into the engine-side auxiliary output 5 and hence for a corresponding energy uptake from the internal combustion engine 1.

The parameters for the energy input into the engine-side auxiliary output 5 or for the corresponding energy uptake from the internal combustion engine 1 are time-points and/or time durations and/or potentials of the energy input into the auxiliary output 5 and thus for the energy uptake from the internal combustion engine 1.

According to an advantageous further development of the invention, the procedure adopted in this case is that when, as a function of the current driving situation and/or as a function of the anticipated driving situation of the motor vehicle, the regulator determines that for a required energy input into the engine-side auxiliary output 5 and hence for a corresponding energy uptake from the internal combustion engine 1, the internal combustion engine 1 would be operating at an operating point unfavorable from the standpoint of efficiency, a load-point displacement triggered by the regulator at the internal combustion engine 1, in particular a load-point increase is carried out, namely in such manner that as a result of the load-point displacement the internal combustion engine is operated at an operating point characterized by a minimum specific fuel consumption. In this way the drive train can be operated particularly efficiently.

According to another advantageous further development of the present invention, when as a function of a current and/or anticipated driving situation of the motor vehicle the regulator determines that an actual recuperation potential and/or an anticipated recuperation potential exist(s) in the drive train, specifically at the drive output 2 thereof, the regulator determines the parameters for energy input into the engine-side auxiliary output 5 and hence for the corresponding energy uptake from the internal combustion engine 1 as a function of the recuperation potential at the time, so that the recuperation potential can be put to the best possible use for operating the engine-side auxiliary output 5.

According to another advantageous further development of the invention, as a function of the current actual value of the condition parameter and as a function of the current and/or anticipated driving situation of the motor vehicle the regulator can modify at least one limit value of the condition parameter to be regulated, in order to ensure efficiency-optimized operation of the drive train.

As data concerning the current driving situation, in particular the current road inclination and/or the current operating point of the internal combustion engine 1 and/or the traffic situation at the time is/are taken into account.

The current road inclination can be measured by an inclination sensor of the drive train, or determined by computation.

As data concerning the anticipated driving situation, in particular the anticipated road inclination along a driving stretch ahead and/or the anticipated traffic situation along a driving stretch ahead is/are taken into account.

The anticipated road inclination along a driving stretch ahead, i.e. topological data about the driving stretch ahead, can be provided for example by a navigation system. Data about the anticipated traffic situation along a driving stretch ahead, for example data about a traffic jam and about speed limits along the driving stretch ahead, can also be provided by a navigation system.

Accordingly, in the context of the method according to the invention the regulation of a condition parameter of an engine-side auxiliary output must be designed to take place as a function of the current actual value of the condition parameter, as a function of limit values of the condition parameter and as a function of a current and/or anticipated driving situation of the motor vehicle.

Depending on this, time-points, time durations and potentials of the power input to the engine-side auxiliary output 5 and hence of the power uptake from the internal combustion engine 1 can be determined, such that for optimizing the efficiency, a load-point displacement is carried out at the internal combustion engine 1 and/or the recuperation potential in the drive train is used to the best possible effect. Moreover, limit values for the regulation of the condition parameter can also be modified as a function of the current and/or anticipated driving situation, and this in particular as a function of the storage function of the engine-side auxiliary output 5 in relation to its condition parameter to be regulated.

Figure 3:
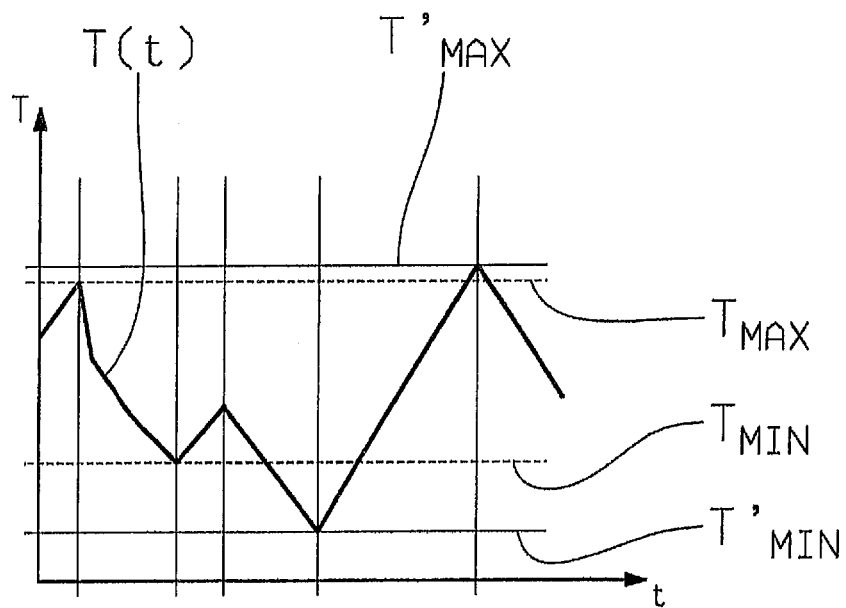
FIG. 3: A diagram to illustrate the method according to the invention for operating a drive train.

FIG. 3 shows a time variation of a condition parameter, namely the temperature T produced in the refrigerating trailer 7 when using the method according to the invention with the drive train of FIG. 1. From FIG. 3 it can be seen that in accordance with the invention the original limit values $T_{MAX}$ and $T_{MIN}$ for regulation have been modified: specifically, the lower limit value $T_{MIN}$ has been displaced downward to the modified lower limit value $T'_{MIN}$ and the upper limit value $T_{MAX}$ has been displaced upward to the modified upper limit value $T'_{MAX}$.

In the drive train of FIG. 1 the downward modification of the lower limit value takes place in particular when, during a braking process or while driving downhill, actual recuperation potential is available in the drive train at the time, which is then preferably used to produce a substantial undercooling of the refrigerating trailer 7, even to a value below the lower temperature limit value $T_{MIN}$.

In this case the storage function of the refrigerating trailer 7 in relation to its condition parameter, namely temperature, is used.

In the drive train of FIG. 1, the upward displacement of the upper temperature limit value $T_{MAX}$ takes place in particular when, with regard to an anticipated driving situation, the regulator recognizes that recuperation potential will shortly become available because of the characteristics of the driving stretch ahead. In this case the power demand by the cooling aggregate 6 and the energy uptake from the internal combustion engine 1 can be delayed, in order to use the forthcoming recuperation potential efficiently for operating the cooling aggregate 6 and thus also the engine-side auxiliary output 5.

INDEXES

1 Internal combustion engine
2 Drive output
3 Transmission
4 Clutch

5 Engine-side auxiliary output
6 Cooling aggregate/Regulator
7 Refrigerating trailer
8 Continuously variable transmission
9 Generator

The invention claimed is:

1. A method of operating a drive-train of a motor vehicle that has a drive aggregate comprising an internal combustion engine and a transmission connected between the drive aggregate and a drive output, an auxiliary output on an engine side is couplable to the internal combustion engine by a continuously variable transmission and a generator such that, when the internal combustion engine is running, the generator is drivable at a constant rotational speed regardless of a speed of the internal combustion engine so as to provide the engine-side auxiliary output via the generator with a defined electric input for operating the engine-side auxiliary output, the method comprising the steps of:

regulating a condition parameter of the engine-side auxiliary output, which has a storage function in relation to the condition parameter that is to be regulated, by a regulator associated with the engine-side auxiliary output between limit values, the condition parameter of the engine-side auxiliary output is regulated as at least one of a function of a current actual value of the condition parameter, as a function of limit values of the condition parameter and as a function of a current driving situation and as a function of an anticipated driving situation of the motor vehicle, such that in the regulator, as a function of these input data, parameters are determined for an energy input into the engine-side auxiliary output and hence for a corresponding energy uptake from the internal combustion engine.

2. The method according to claim 1, further comprising the step of when, as a function of at least one of the current driving situation and the anticipated driving situation of the motor vehicle, the regulator determines that for a required energy input into the engine-side auxiliary output and hence for a corresponding energy uptake from the internal combustion engine, the internal combustion engine will be operating at an operating point not favorable for efficiency, initiating and carrying out with the regulator a load-point displacement in a direction toward an operating point characterized by minimum specific fuel consumption.

3. The method according to claim 1, further comprising the step of when, as a function of at least one of the current driving situation and the anticipated driving situation of the motor vehicle, the regulator determines that at least one of a current recuperation potential and an anticipated recuperation potential exists in the drive-train, determining the parameters for energy input into the engine-side auxiliary output and hence for a corresponding energy uptake from the internal combustion engine as a function of this.

4. The method according to claim 1, further comprising the step of modifying, with the regulator, at least one limit value for the condition parameter to be regulated as a function of at least one of the current actual value of the condition parameter, the current driving situation and the anticipated driving situation of the motor vehicle.

5. The method according to claim 1, further comprising the step of taking into account as the current driving situation at least one of a current road inclination and a current operating point of the internal combustion engine and the current traffic situation.

6. The method according to claim 1, further comprising the step of taking into account as the anticipated driving situation at least one of an anticipated road inclination along a driving stretch ahead and the anticipated traffic situation along a driving stretch ahead.

7. The method according to claim 1, further comprising the step of determining as parameters for an energy input into the engine-side auxiliary output and hence for a corresponding energy uptake from the internal combustion engine, at least one of time-points, time durations and potentials of the energy input and hence of the energy uptake.

8. The method according to claim 1, further comprising the step of operating as the engine-side auxiliary output as a cooling aggregate to cool a refrigeration trailer of the motor vehicle, and regulating the temperature in the refrigeration trailer, as the condition parameter, with a two-point regulator between two temperature limit values.

9. The method according to claim 8, further comprising the step of when, as a function of the current driving situation of the motor vehicle, the regulator detects the existence of an actual recuperation potential, displacing a lower temperature limit value downward, as a function of the current actual value of the temperature, in order to utilize an actual recuperation potential to a best possible effect.

10. The method according to claim 8, further comprising the step of when the regulator detects, as a function of the anticipated driving situation of the motor vehicle, an anticipated recuperation potential, then displacing an upper temperature limit value, as a function of the current actual value of the temperature, upward in order to utilize the anticipated recuperation potential to the best possible effect.

11. A method of operating a drive train of a motor vehicle having an internal combustion engine, a drive transmission and a drive output, the drive transmission being located between the internal combustion engine and the drive output, an engine side auxiliary output being coupled to the internal combustion engine via a continuously variable transmission and a generator, the generator being driven, by operation of the internal combustion engine, at a constant rotational speed regardless of a speed of the internal combustion engine to provide, via the generator, the auxiliary output with a defined electric input for operating the engine-side auxiliary output, the method comprising the steps of:

regulating with a regulator a condition parameter of the engine-side auxiliary output, which has a storage function, in relation to the condition parameter that is to be regulated, and the condition parameter being regulated between limit values;

regulating the condition parameter as a function of a current actual value of the condition parameter, a function of the limit values of the condition parameter and as a function of at least one of a current driving situation and an anticipated driving situation of the motor vehicle; and determining other parameters for an energy input into the engine-side auxiliary output and for a corresponding energy uptake from the internal combustion engine.

* * * * *